United States Patent [19]
Gnutel

[11] Patent Number: 5,222,666
[45] Date of Patent: Jun. 29, 1993

[54] LAWN MOWER PESTICIDE FOGGER

[76] Inventor: Robert A. Gnutel, 46 Wilson Crescent, Sherwood Park, Alberta, Canada, T8A 3L2

[21] Appl. No.: 873,836

[22] Filed: Apr. 27, 1992

Related U.S. Application Data

[63] Continuation-in-part of Ser. No. 631,417, Dec. 21, 1990, abandoned.

[30] Foreign Application Priority Data

Jul. 2, 1991 [CA] Canada .................................. 2052545

[51] Int. Cl.$^5$ .............................................. B05B 1/24
[52] U.S. Cl. .............................. 239/129; 239/DIG. 6; 222/146.3
[58] Field of Search .......................... 239/129, DIG. 6; 222/146.3

[56] References Cited

U.S. PATENT DOCUMENTS

| | | | |
|---|---|---|---|
| 2,894,265 | 7/1959 | Reardon | 239/129 |
| 2,901,182 | 8/1959 | Cragg et al. | 239/DIG. 6 |
| 3,219,027 | 11/1965 | Roche | 239/129 |
| 3,253,647 | 5/1966 | Deshaies | 222/146.3 |
| 3,338,524 | 8/1967 | Rhein et al. | 239/DIG. 6 |
| 3,595,481 | 7/1971 | Enblom | 239/129 |
| 4,173,094 | 11/1979 | Nichols, Jr. | 239/129 X |
| 4,298,167 | 11/1981 | Stahl et al. | 239/129 |
| 4,512,515 | 4/1985 | Tenney | 239/129 |
| 4,593,753 | 6/1986 | McConnel | 239/129 |
| 4,779,805 | 10/1988 | Jackson et al. | 239/704 |

FOREIGN PATENT DOCUMENTS

| | | | |
|---|---|---|---|
| 005414 | 11/1979 | European Pat. Off. | 239/129 |
| 086075 | 8/1983 | European Pat. Off. | |
| 357154 | 3/1990 | European Pat. Off. | |

OTHER PUBLICATIONS

Computer Patent Ref. Abstract Only France 2,225,090 Dec. 1974.

*Primary Examiner*—Andres Kashnikow
*Assistant Examiner*—Lesley D. Morris
*Attorney, Agent, or Firm*—Robert W. B. Bailey

[57] ABSTRACT

A pesticide fogger suitable for use with internal combustion engines has a heat exchanger built into the exhaust. A pesticide line is run along the exhaust, its entry port is at the hottest point of the exhaust, suitably about 3 inches from the inlet end of the exhaust. The line is wound in counter current flow in six coils around the exhaust between the muffler and the entry port. An outer sleeve surrounds heat exchanger, exhaust and entry port to form a sealed chamber. The discharge pipe apertures in the muffler are at least 3/16 inch in diameter. The device is conveniently an exhaust component for attachment to an internal combustion engine, and is suitable for lawn mowers. A hand operated accordion primer pump built into the pesticide container conveniently provides initial positive pressure.

20 Claims, 1 Drawing Sheet

LAWN MOWER PESTICIDE FOGGER

This application is a continuation-in-part of Ser. No. 07/631,417, filed Dec. 21, 1990, now abandoned.

This invention relates to lawn mower pesticide foggers and processes of fogging pesticides. In particular it relates to apparati and processes for atomizing pesticides through internal combustion engine exhaust systems.

Although the invention will be described and referred to specifically as it relates to apparati and processes for atomizing pesticides through internal combustion engine exhaust systems, it will be understood that the principles of this invention are equally applicable to similar apparati and processes and accordingly, it will be understood that the invention is not limited to such apparati and processes.

DESCRIPTION OF PRIOR ART

U.S. Pat. No. 3,338,524 (1967) shows a pesticide line leading directly into the exhaust line muffler of an engine, where it is contact vaporized or atomized.

U.S. Pat. No. 4,298,167 (1981) shows a pesticide mist generator having a perforated protective housing around a pulsating combustion chamber.

U.S. Pat. No. 4,593,753 (1986) teaches to heat liquid by exhaust gases utilizing heat exchange which includes copper coils wound around a primary exhaust pipe.

These references were deemed the closest by the United States examiner to the invention claimed in Ser. No. 07/631,417.

None of the above references teaches the desirability of preheating pesticide solution before introducing the pesticide into the hot gas flow, nor that the degree of preheating affects the pesticide fog produced.

It is an object of the invention to provide improved apparati and processes for atomization and vaporization of pesticides to form fogs.

DESCRIPTION OF THE INVENTION

Besides the prototypes discussed in Ser. No. 07/631,417, which worked fairly well, extensive experimentation was applied to improve the performance of the device and especially to produce a suitable fog which effectively killed insects and broke down quickly like cigarette smoke.

Experiments were carried out on lawn mowers with a 3.5 horse power engine and approximately 0.84 inch exhaust pipes, these are effectively the standard lawn mower. The 0.84 inch exhaust pipes are commonly referred to as "half inch pipes."

Initially ¼ inch copper line was utilized with four coils around the exhaust pipe, this produced a thick fog but the fluid went through too quickly producing liquid flow of pesticide from the exhaust, and a poor fog. Six coils of ¼ inch line was used, with virtually no change, again liquid flow came from the exhaust, with a poor fog. Four inlet locations and three types of muffler were tested.

⅛ inch copper line was tested, with four coils, this burned the pesticide producing too light a fog, six and seven coils has no better result. The flow of pesticide was too light, to produce a thick enough fog for a good cloud for a brief period of carry time to kill insects.

3/16 inch copper tubing was tested, again with four five, six, and seven coils, the results were better but not consistent. The location of the entry port to the exhaust was found critical, the distances of about 1, 2, 3, 4, 5 and 5.5 inches from the inner end of the exhaust pipe, were tested the 3 inch position was best, it also was the hottest point in the exhaust. In similar but different engine exhausts the position may be routinely determined by those skilled in the art. When the distance was less than about 3 inches, the exhaust was not hot enough, thus a fine mist but not an effective fog was produced. When the distance was greater than about 3 inches the exhaust was not hot enough thereby producing a fine mist.

The number of coils was changed to determine the most effective number at the 3 inch position, this was found to be six, which produced a thick effective fog. Five coils heated insufficiently to break down or atomize the pesticide solution. Seven coils overheated and appeared to burn off the solution producing little fog.

The number of coils could be varied by adjusting the engine rpm, but it was found hard to control rpm reliably to fit coils, when the engine was throttled down. When the engine was run at full throttle, six coils worked best. Further lower rpm were not as satisfactory in fog quantity and quality production.

Prototypes with the pesticide flow counter current to the hot gas flow functioned much better than those with the pesticide flow in the same direction.

It was also discovered that the muffler affected back pressure and in turn this affected fog quality. Three mufflers worked after a fashion, but one worked much better. After long and careful investigation it was found that throttling down the engine with the three mufflers produced a fog, but not hot enough to work well, the flow of pesticide was reduced as well. The muffler that worked best was coarse with 15 large discharge pipe holes of 3/16 inch diameter, while those that didn't work had smaller holes typically about 15 or 24 of 3/32 inch diameter. Desirably the muffler had discharge pipe holes of at least 3/16 inch diameter.

It proved advisable to provide a pump on the pesticide storage tank, to provide initial positive priming pressure on the line. A small hand bellows or accordion pump was set into the container to provide initial positive pressure. The type preferred is that described in U.S. Pat. No. 4,750,634, herein incorporated by reference.

In one broad aspect the invention is directed to an improved apparatus to produce an effective pesticide fog, from liquid pesticide, which has in combination exhaust pipe means, having inlet and outlet means, to carry hot gas flow from an internal combustion engine, and line means to supply the liquid to the exhaust pipe means. The improvement provides the line means having entry port means in the exhaust pipe means at approximately the hottest point in the hot gas flow. Typically this is about 3 inches from the inlet end of the exhaust pipe means. The line means includes heat exchange means, whereby heat is exchanged between the exhaust pipe means and the line means. The heat exchange means includes coil means contacting the exhaust pipe means with six coil turns counter current to the hot gas flow, between the outlet end and the entry point means. Outer sleeve means surrounds the exhaust pipe means, the heat exchange means, and the entry port means to form sealed chamber means.

In another broad aspect the invention is directed to an improved exhaust component to produce an effective pesticide fog, from liquid pesticide, which has in combination exhaust pipe means, having inlet and outlet means, to carry hot gas flow from an internal combustion engine, and line means to supply the liquid to the exhaust pipe means. The improvement provides the line means having entry port means in the exhaust pipe means approximately at the hottest point of the hot gas flow. Typically this is about 3 inches from the inlet end of the exhaust pipe means. The line means includes heat exchange means, whereby heat is exchanged between the exhaust pipe means and the line means. The heat exchange means includes coil means contacting the exhaust pipe means with six coil turns counter current to the hot gas flow, between the outlet end and the line means. Outer sleeve means surrounds the exhaust pipe means, the heat exchange means, and the entry port means to form sealed chamber means.

In a third broad aspect the invention is directed to an improved lawn mower having internal combustion engine means, and modified exhaust means to produce an effective pesticide fog, from liquid pesticide, which has in combination exhaust pipe means, having inlet and outlet means, to carry hot gas flow from an internal combustion engine, and line means to supply the liquid to the exhaust pipe means. The improvement provides the line means having entry port means in the exhaust pipe means approximately at the hottest point of the hot gas flow. Typically this is about 3 inches from the inlet end of the exhaust pipe means. The line means includes heat exchange means, whereby heat is exchanged between the exhaust pipe means and the line means. The heat exchange means includes coil means contacting the exhaust pipe means with six coil turns counter current to the hot gas flow, between the outlet end and the line means. Outer sleeve means surrounds the exhaust pipe means, the heat exchange means, and the entry port means to form sealed chamber means.

In the apparatus, the exhaust component, and the lawn mower the entry port means is preferably about 3 inches from the inlet end. In the apparatus, the exhaust component, and the lawn mower the outlet end preferably connects to muffler means, which -comprises discharge chamber apertures of at least 3/16 inch in diameter. In the apparatus, the exhaust component, and the lawn mower the inlet end is preferably externally threaded to engage an exhaust port of an internal combustion engine, and may be threadably engaged thereto. In both apparatus and lawn mower are preferably provided container means for the liquid pesticide, connected by second line means to the first line means, the container means preferably includes primer pump means, which may be hand operable.

As a nonbinding hypothesis it is believed that the preheating of the pesticide solution breaks it down into smaller fluid particles or droplets before entering the hot gas flow, where extensive exhaust heat and pressure further break the fluid particles entering the hot gas flow into even smaller particles vaporizing some completely. The pesticide exhaust gas mixture cools on exiting the muffler into an excellent fog.

BRIEF DESCRIPTION OF THE DRAWINGS

Preferred embodiments are indicated in the drawings where.

DESCRIPTION OF THE PREFERRED EMBODIMENTS

Figure 1:
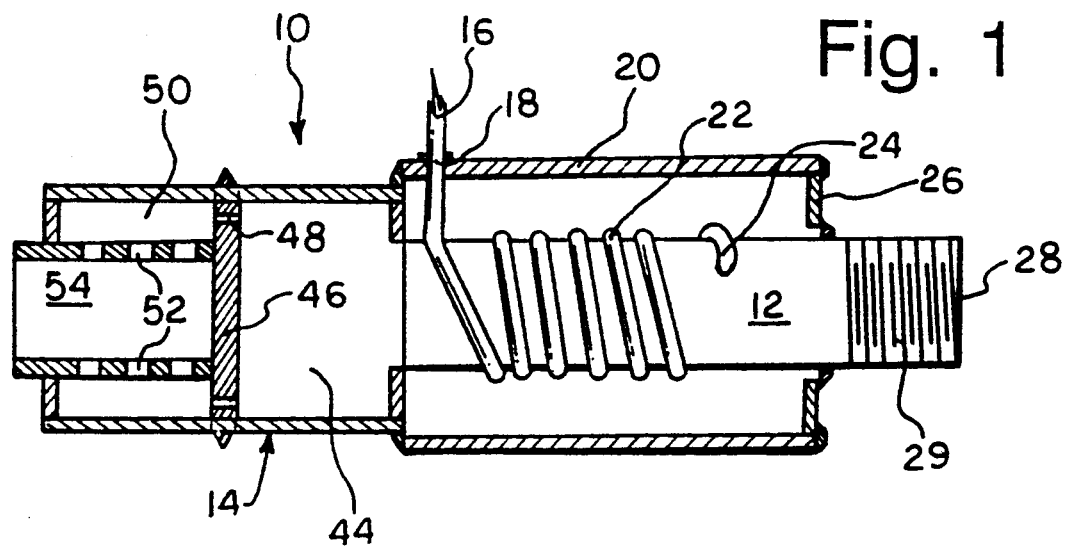
FIG. 1 shows a partly sectional view of an embodiment of the invention.
Figure 2:
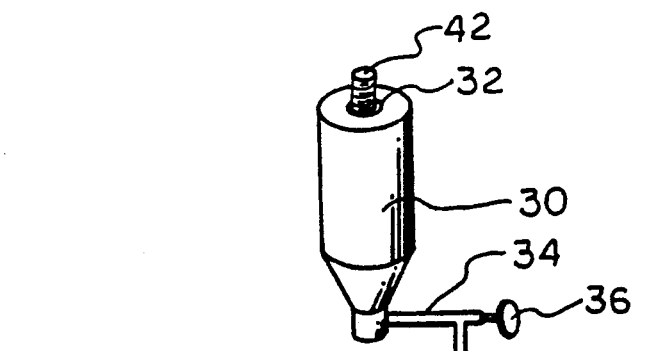
FIG. 2 shows the invention in use as attached to a lawn mower, omitting details of the lawn mower.

The general description of the invention is now expanded by reference to the drawings, which illustrate preferred embodiments of the invention.

Numeral 10 generally indicates the exhaust system of an internal combustion engine including exhaust pipe 12 and muffler 14. Pesticide line 16 carries pesticide solution from a reservoir (not shown) to exhaust system 10. Pesticide line 16 is passed through hole 18 in sleeve 20, then coiled in six counter current coils 22 around exhaust pipe 12, to line insert 24. Coils 22 are sealed within sleeve 20 which is welded to muffler 14, and washer 26, in turn welded to exhaust pipe 12, to form a seal. Exhaust pipe 12 has external threads 29, and inlet end 28. The critical dimension is the placing of line insert 24, about 3 inches from inlet end 28. Other dimensions are less critical. The exhaust pipe is typically about 0.84 inch in diameter, its threaded portion 29 extends about 11/16 inch along the pipe. The pesticide heating coil is required to be about 3/16 inch, wound six times around the pipe including 5 full and two half coils as shown. Stainless steel is preferred, but steel or hydraulic tubing may be utilized. The sleeve must fit to the muffler to form a sealed space, it may be 1½ inch or 1.90 inch in diameter, the pesticide line 16 is led into the sleeve, through hole 18. The muffler is typically about 1 13/16 inch diameter except at the middle flange which is 1⅞ inch, while the discharge pipe of the muffler is 13/16 inch diameter. The internal discharge pipe holes must be at least 3/16 inch in diameter, smaller ones do not work as satisfactorily.

Exhaust pipe 12 enters muffler 14 into inlet chamber 44, which is blocked by baffle plate 46. Peripheral baffle plate holes 48 in baffle plate 46, communicate with discharge chamber 50, which communicates through discharge pipe holes 52 with discharge pipe 54. The exhaust gas flow passes into inlet chamber and can only escape through baffle plate 46 by baffle plate holes 48 into discharge chamber 50, whence it passes through discharge pipe holes 52 into discharge pipe 54. In the common commercially available lawn mower mufflers, applicant found variation in inlet pipe hole and baffle plate hole size typically 3/16 inch, and 21 to 24 holes which produced no noticeable effect. Variation in discharge pipe holes produced significant effects; 3/16 inch holes working, while 3/32 inch did not.

In use threads 29 threadably engages the lawn mower exhaust port. The pesticide solution is in container 30, which may be pressure primed by accordion or bellows pump 42, which is threaded into filler cap 32, filler line 34 passes the pesticide through shut off valve 36, and feed line 38 to pesticide line 16. The pesticide enters exhaust system 10 to emerge as fog 40.

Lawn mower 50 and its exhaust port 51 are indicated in ghost to show attachment of exhaust system 10.

Applicant tested the above noted embodiment with Canadian government approved pyrethin insecticide in an oil base. This type of insecticide is considered safe for humans, birds and animals. Applicant however recommends that it should be fogged downwind and that the operator should use a mask while dispensing insecticide.

Applicant has found steel lines are satisfactory as heat exchange elements, copper tends to corrode. Applicant prefers to utilize stainless steel as the supply line, because of its longer life, but steel is satisfactory, alternatively hydraulic tubing may As those skilled in the art would realize these preferred illustrated dimensions, details and components can be subjected to substantial variation, modification, change, alteration, and substitution without affecting or modifying the function of the illustrated embodiments.

This invention is not limited to the embodiments described above, and it will be apparent to persons skilled in the art that numerous modifications and variations form part of the present invention insofar as they do not depart from the spirit, nature and scope of the claimed and described invention.

I claim:

1. In an apparatus to produce an effective pesticide fog, from liquid pesticide, having in combination exhaust pipe means to carry hot gas flow from an internal combustion engine, said exhaust pipe means having inlet and outlet ends, and first line means to supply said liquid to said exhaust pipe means, the improvement comprising said first line means having entry port means in said exhaust pipe means approximately at the hottest point of said hot gas flow, and said first line means including heat exchange means, whereby heat is exchanged between said exhaust pipe means and said first line means, said heat exchange means including coil means contacting said exhaust pipe means with six coil turns counter current to said hot gas flow, between said outlet end and said first line means, sleeve means surrounding said exhaust pipe means, said heat exchange means, and said entry port means to form sealed chamber means.

2. An apparatus of claim 1, wherein said entry port means is about 3 inches from said inlet end.

3. An apparatus of claim 2, wherein said outlet end connects to muffler means having discharge pipe apertures at least 3/16 inch in diameter.

4. An apparatus of claim 3, additionally comprising container means for said liquid pesticide, connected by second line means to said first line means, said container means including primer pump means.

5. An apparatus of claim 4, wherein said inlet end is externally threaded to engage exhaust port means of internal combustion engine means.

6. An apparatus of claim 1, wherein said outlet end connects to muffler means having discharge pipe apertures of at least 3/16 inch in diameter.

7. An apparatus of claim 1, additionally comprising container means for said liquid pesticide, connected by second line means to said first line means, said container means including primer pump means.

8. In an exhaust component, adapted to produce an effective pesticide fog from liquid pesticide, having in combination exhaust pipe means to carry hot gas flow from an internal combustion engine, said exhaust pipe means having inlet and outlet ends, and first line means to supply said liquid to said exhaust pipe means, the improvement comprising said first line means having an entry port in said exhaust pipe means approximately at the hottest point of said hot gas flow, and said first line means including heat exchange means, whereby heat is exchanged between said exhaust pipe means and said first line means, said heat exchange means including coil means contacting said exhaust pipe means with six coil turns counter current to said hot gas flow, between said outlet end and said first line means, sleeve means surrounding said exhaust pipe means, said heat exchange means, and said entry port means to form sealed chamber means.

9. An exhaust component of claim 8, wherein said entry port means is about 3 inches from said inlet end.

10. An exhaust component of claim 9, wherein said outlet end connects to muffler means having discharge pipe apertures of at least 3/16 inch in diameter.

11. An exhaust component of claim 10, wherein said inlet end is externally threaded to engage an exhaust port of an internal combustion engine.

12. An exhaust component of claim 8, wherein said outlet end connects to muffler means having discharge pipe apertures of at least 3/16 inch in diameter

13. An exhaust component of claim 8, wherein said inlet end is externally threaded to engage an exhaust port of an internal combustion engine.

14. In a lawn mower having internal combustion engine means, and modified exhaust means to produce an effective pesticide fog, from liquid pesticide, having in combination exhaust pipe means to carry hot gas flow from an internal combustion engine, said exhaust pipe means having inlet and outlet ends, and first line means to supply said liquid to said exhaust pipe means, the improvement comprising said first line means having entry port means in said exhaust pipe means at approximately the hottest point in said hot gas flow, and said first line means including heat exchange' means, whereby heat is exchanged between said exhaust pipe means and said first line means, said heat exchange means including coil means contacting said exhaust pipe means with six coil turns counter current to said hot gas flow, between said outlet end and said first line means, sleeve means surrounding said exhaust pipe means, said heat exchange means, and said entry port means to form sealed chamber means.

15. A lawn mower of claim 14, wherein said entry port means is about 3 inches from said inlet end.

16. A lawn mower of claim 15, wherein said outlet end connects to muffler means, having discharge pipe apertures of at least 3/16 inch in diameter.

17. A lawn mower of claim 16, additionally comprising container means for said liquid pesticide, connected by second line means to said first line means, said container means including primer pump means.

18. A lawn mower of claim 17, wherein said inlet end is externally threaded and threadably engages exhaust port means of internal combustion engine means.

19. A lawn mower of claim 14, wherein said outlet end connects to muffler means having discharge pipe apertures of at least 3/16 inch in diameter.

20. A lawn mower of claim 14, additionally comprising container means for said liquid pesticide, connected by second line means to said first line means, said container means including primer pump means.

* * * * *